United States Patent [19]
McCullough et al.

[11] 4,323,053
[45] Apr. 6, 1982

[54] SOLAR HEATER WITH INTEGRAL HEAT TRAP GLAZING

[75] Inventors: Robert W. McCullough, Tarrytown; Thomas A. Hewett, Chappaqua, both of N.Y.

[73] Assignee: Union Carbide Corporation, Danbury, Conn.

[21] Appl. No.: 141,328

[22] Filed: Apr. 18, 1980

Related U.S. Application Data

[63] Continuation of Ser. No. 824,103, Aug. 12, 1977, abandoned.

[51] Int. Cl.$^3$ .................................................. F24J 3/02
[52] U.S. Cl. .................................... 126/441; 126/417; 126/447; 126/449; 126/450
[58] Field of Search ............... 126/417, 441, 450, 449, 126/446, 447, 432, 428

[56] References Cited

U.S. PATENT DOCUMENTS

| | | | |
|---|---|---|---|
| 2,680,437 | 12/1945 | Miller | 126/441 |
| 2,680,565 | 6/1954 | Löf | 126/429 |
| 2,998,005 | 8/1961 | Johnston | 126/419 |
| 3,102,532 | 9/1963 | Shoemaker | 126/441 |
| 3,875,925 | 4/1975 | Johnston | 126/435 |
| 3,919,445 | 11/1975 | Smarook | 428/116 |
| 3,939,818 | 2/1976 | Hamilton et al. | 126/432 |
| 3,953,110 | 4/1976 | Charondi | 126/441 |
| 3,981,294 | 9/1976 | Deminet | 126/443 |
| 3,985,116 | 10/1976 | Kapany | 126/439 |
| 4,015,582 | 4/1977 | Liu et al. | 126/450 |
| 4,015,583 | 4/1977 | Laing | 126/438 |
| 4,018,211 | 4/1977 | Barr | 126/439 |
| 4,019,496 | 4/1977 | Cummings | 126/441 |
| 4,034,736 | 7/1977 | Telkes | 126/432 |
| 4,038,969 | 8/1977 | Smith | 126/448 |
| 4,062,352 | 12/1977 | Lesk | 126/445 |
| 4,064,868 | 12/1977 | Nussbaum | 126/420 |
| 4,068,361 | 1/1978 | Root | 126/444 |
| 4,068,361 | 1/1978 | Root | 126/444 |
| 4,092,977 | 6/1978 | Gurtler et al. | 126/444 |
| 4,119,083 | 10/1978 | Heyen et al. | 126/449 |

FOREIGN PATENT DOCUMENTS 53-1088576  2/1978  Japan.

OTHER PUBLICATIONS

Hollands, "Honeycomb Devices in Flat-Plate Solar Collectors", Solar Energy, vol. 9, No. 3, pp. 159–164, (1965).
Buchberg et al., "Performance Characteristics of Rectangular Honeycomb Solar-Thermal Connectors", Solar Energy, No. 13, pp. 193–221, Pergamon Press, (1971).
Bevill et al., "A Solar Energy Collector for Heating Air", Solar Energy, vol. 12, pp. 19–29, Pergamon Press, (1968).
Lalude et al., "Design and Application of Honeycomb Porous-Bed Solar Air Heater", Solar Energy, vol. 13, pp. 223–242, Pergamon Press, (1971).
Whillier, "Black-Painted Solar Air Heater of Conventional Design", Solar Energy, vol. 8, No. 1, pp. 31–37, Pergamon Press, (1964).
Selcuk, "Thermal and Economic Analysis of the Overlapped-Glass Plate Solar-Air Heater", Solar Energy, vol. 13, pp. 165–191, Pergamon Press, (1971).
Henderson et al., "Performance of a Matrix Solar Collector for Heating Air", 1975 Annual Meeting of the American Society of Agricultural Engineers, 6/22-25, 1975, paper No. 75-3005.
Edwards et al., "End-Clearance Effects on Rectangular-Honeycomb Solar Collector", Solar Energy, vol. 18, pp. 253–257, Pergamon Press, (1976).
Chun et al., "Effect of a Mylar Honeycomb Layer on Solar Collector Performance", 1974 Winter Annual Meeting of ASME, (paper No. 74-WA/HT-11).
Bliss, "Solar House Heating-A Panel", Proceedings, World Symposium of Applied Solar Energy, Phoenix, 1955, pp. 151–158.
Marshall et al., "Use of Lexan and Kapton Honeycombs to Increase Solar Energy Efficiency", 16th National Heat Transfer Conference, St. Louis, MO, 8/8-11, 1976.

*Primary Examiner*—Larry Jones
*Attorney, Agent, or Firm*—Gary L. Wamer

[57] ABSTRACT

A solar heater including a housing having a combined transparent front wall and heat trap, a radiation absorbent collector element positioned in the housing and arranged to accept incident solar radiation passing through the front wall, and means for passing a fluid medium to be heated through the housing in heat transfer relationship with the collector element. The combined front wall and heat trap are integrally formed in one piece from glass or a clear plastic composition which is opaque to infrared radiation emitted from the collector element.

13 Claims, 3 Drawing Figures

SOLAR HEATER WITH INTEGRAL HEAT TRAP GLAZING

This application is a continuation of our prior U.S. application Ser. No. 824,103 filing date Aug. 12, 1977, now abandoned.

BACKGROUND OF THE INVENTION

I. Field of the Invention

The present invention relates broadly to solar heaters which convert incident solar radiation into heat energy and transfer the absorbed heat either to a gas such as air or a liquid such as water, the former being commonly referred to as a solar air heater and the latter being commonly referred to as a solar water heater. More particularly, the present invention relates to solar heaters of either type which employ a heat trap between the absorber and the light-transmitting front wall.

II. Description of the Prior Art

Various proposals have already been made in the prior art for employing a heat trap between the absorber and the front wall of a flat plate solar heater in order to reduce heat losses by natural convection and radiation. An example of the foregoing wherein a transparent honeycomb heat trap is used may be found in an article by Hollands entitled, "Honeycomb Devices in Flat Plate Solar Collectors", Solar Energy, Vol. 9, pp. 159-169, Pergamon Press (1965). One problem encountered with such proposals is that it may as a practical matter be necessary to provide space between the honeycomb heat trap and the front wall to allow for differential thermal expansion of the solar heater elements. It has been found, however, that the presence of such a space can increase the heat loss by natural convection to the front wall. This increased heat loss results from the development of natural convection currents between adjacent cells of the honeycomb structure.

It has been observed in the results of recent work by Edwards, et al., in "End-Clearance Effects on Rectangular-Honeycomb Solar Collectors" presented at the 1975 International Solar Energy Congress and Exposition, July 28-Aug. 1, 1975, UCLA, Los Angeles; also published in Solar Energy, Vol. 18, pp. 253-257, Pergamon Press (1976), that this increase in heat loss may be reduced by providing a space between the honeycomb heat trap and the flat plate absorber rather than between the heat trap and the front wall. The difficulty with this proposal, however, is that the honeycomb must of necessity be made with relatively thin walls in order to act as an efficient heat trap and, consequently, the honeycomb is either too flexible to be self-supporting if made of clear plastic or extremely fragile if made of glass and, therefore, separate means for supporting the honeycomb structure over its entire area must be provided.

It has also been proposed in the prior art to employ a honeycomb or other open cellular structure in contact with the front wall to act as a radiation trap and air buffer in a transpiration solar air heater. Thus, in our copending application Ser. No. 824,100, now U.S. Pat. No. 4,262,657 filed on even date herewith and assigned to the common assignee hereof, and which is a Continuation-in-Part of our earlier application Ser. No. 712,139 filed on Aug. 6, 1976, now abandoned, there is disclosed and claimed a transpiration solar air heater wherein the cellular radiation trap is held in at least firm mechanical contact with the front wall in order that it may additionally act as an air buffer layer. It has been demonstrated by experimental work, as reported in our copending application, that a significant improvement in thermal efficiency is attained when the radiation trap is held firmly in contact with or is actually bonded to the front wall. When the radiation trap, on the other hand, is only loosely held in place adjacent to the front wall, the problem arises that convection currents may pass through the heat trap and contact the front wall where heat losses may occur.

In the case of both the flat plate solar heater and the transpiration solar air heater described above, the heat trap may be supported in contact with the front wall by one or more rigid bars below the cellular or honeycomb heat trap or by the provision of adhesive joints between the heat trap and the front wall. Although this type of support means effectively solves the problem of convective air flow through the heat trap, the drawback of support means of this type is that the bars or adhesive joints or other support elements introduce additional surfaces from which incident solar rays may be reflected or scattered in a direction away from the solar absorber and be lost.

SUMMARY OF THE INVENTION

The present invention is directed to a novel and improved solar heater which overcomes the above enumerated problems in either a flat plate solar heater or a transpiration solar air heater. The solar heater of the present invention includes a housing having a light-transmitting or transparent front wall and a radiation absorbent collector element arranged to accept incident solar radiation passing through the front wall. The solar heater further includes a heat trap which is integrally formed in one piece with the front wall in accordance with the principles of the present invention. The heat trap thus formed is significantly stronger than the unsupported cellular heat trap by itself and requires no further support to maintain it in position against the front wall. The problems described above for both flat plate solar heaters and transpiration solar air heaters are thus solved without the introduction of support elements or adhesive bonds or joints from which incident solar rays may be reflected away from the radiation absorbent element and be lost. In addition, since there are no adhesive bonds in the heat trap of the present invention, there are no problems with aging of the adhesive, i.e., discoloration, embrittlement, cracking, etc.

For purposes of simplicity, the combined integrally formed heat trap and front wall shall be hereinafter referred to as an "integral heat trap glazing" throughout the following description.

The principal object of the present invention is therefore to provide a solar heater having an integral heat trap glazing which is self-supporting and which has a higher overall transmission of incident solar rays than heat traps supported adjacent to the front wall of prior art solar heaters.

Another object of the present invention is to provide a novel and improved integral heat trap glazing for use in solar heaters which is strong, durable, easy to handle and economical to manufacture.

DESCRIPTION OF THE DRAWING

The present invention will now be described in greater detail hereinafter with particular reference to the accompanying drawing which shows the preferred embodiments thereof and wherein.

DESCRIPTION OF THE PREFERRED EMBODIMENTS

It will be understood that the principles of the present invention are applicable to both a flat plate solar heater and a transpiration solar air heater although the integral heat trap glazing performs somewhat different functions in each type of solar heater. For purposes of convenience, the principles of the present invention will be disclosed independently with respect to each type of solar heater in the following description.

Figure 1:
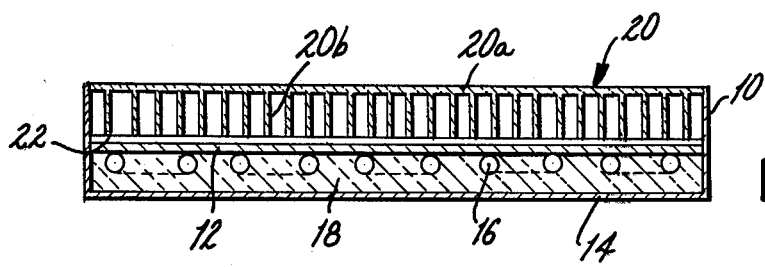
FIG. 1 is an elevational, schematic, cross-sectional view of a typical flat plate solar heater made in accordance with the present invention.

Referring now specifically to FIG. 1 of the drawing, there is shown a flat plate solar heater embodying the present invention. The solar heater comprises a housing 10 including a flat radiation absorbent collector plate 12 spaced from a back wall 14. A tubular coil 16 or other passage means for a fluid such as air or water is provided in the space below and in contact with the flat plate absorber 12. Preferably, although not necessarily, the remaining space between the flat plate absorber 12 and the back wall 14 is filled with a suitable insulation as denoted by the reference numeral 18. The housing 10 may suitably be made of a rigid metal such as aluminum or steel or other rigid material such as plastic or fiberglass.

The housing 10 further includes an integral heat trap glazing 20 which serves as the light transmitting front wall of the solar heater in accordance with the present invention. As shown, the integral heat trap glazing 20 is made in a single piece but has a flat upper surface 20a which faces outwardly from the solar heater and a lower surface 20b which faces inwardly and which is spaced a short distance above the flat absorber plate 12 to provide a small gap 22 of, for example, about 5 mm. or less. The lower surface 20b is formed by a multiplicity of cellular openings with walls which are substantially perpendicular to the upper surface 20a. The cellular openings which constitute the lower surface 20b may be in the form of a honeycomb or other cellular structure such as that formed by parallel fins. The integral heat trap glazing 20 may be made in one piece by conventional forming or molding techniques as shall be described hereinafter in greater detail. Suitably, the glazing 20 may be made from glass or clear plastic compositions such as polyvinyl fluoride, polycarbonate, fluorinated ethylene propylene, polymethyl methacrylate, aromatic polysulfones, polyethylene terephthalate, aromatic polyesters, polyvinylidene fluoride, hexafluoropropylene, chlorotrifluoroethylene and tetrafluorethylene copolymers.

During operation of the solar heater, incident solar rays pass through the integral heat trap glazing 20 and are absorbed by the flat collector plate 12 and are converted to heat. This heat in turn is transferred by conduction and convection to a fluid such as air or water which is circulated through the coil 16 in contact with the collector plate 12.

In this embodiment of the present invention, the integral heat trap glazing 20 serves the dual function of reducing the radiative heat loss from the solar heater and of suppressing the onset of natural convection in the air space between the flat collector plate and the front wall. In order for the cellular lower surface 20b of the integral heat trap glazing 20 to effectively reduce heat loss by radiation, the cellular openings must be of a sufficiently high aspect ratio as described and claimed in detail in our copending application Ser. No. 824,100 supra, i.e., in the range of 2 to 10 for honeycomb cellular structures and 4 to 20 for finned cellular structures. As shown in FIG. 1, the walls of the cellular openings divide up the air space between the flat collector plate and the front wall and inhibit the development of natural convection currents. At the same time, a small gap 22 is maintained between the lower surface 20b of the glazing 20 and the flat absorber plate 12 to allow for differential thermal expansion of the solar heater elements.

Figure 2:
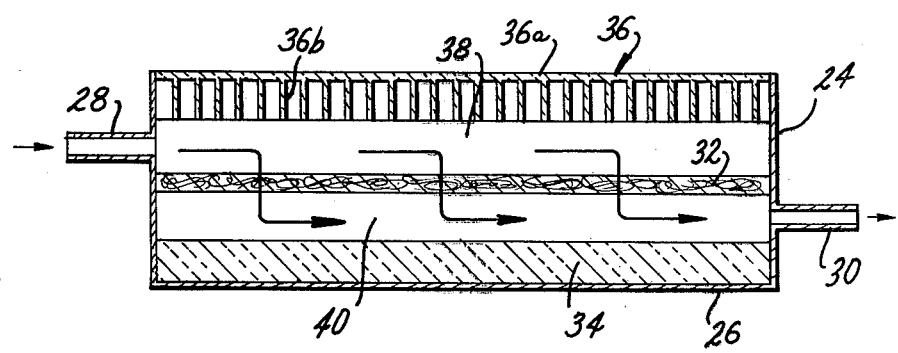
FIG. 2 is a similar view showing a typical transpiration solar air heater also made in accordance with the present invention.

FIG. 2 shows a transpiration solar air heater embodying the present invention. As shown, the transpiration solar air heater comprises a housing 24 having a back wall 26, and an inlet 28 in one side wall and an outlet 30 in the opposite side wall which establish a flow path for a gas such as air to be heated as generally indicated by the arrows in the drawing. A porous, radiation absorbent collector plate 32 is mounted inside the housing 24 in spaced apart parallel relation to the back wall 26 and across the flow path established between the inlet 28 and the outlet 30. The porous collector plate 32 may be composed for example of a porous darkened or black fibrous mat, woven or stamped screens, or reticulated foam. Although the porous collector plate 32 is shown in spaced parallel relation to the back wall 26, it will be understood that the collector plate may be positioned in non-parallel relation to the back wall as disclosed and claimed in our copending application Ser. No. 824,100. If desired, a layer of insulation 34 may be placed adjacent to the back wall 26 and in spaced apart relation to the porous collector plate 32. Again, the housing 24 may be made of a rigid metal such as aluminum or steel or other rigid material such as plastic or fiberglass.

The housing 24 further includes an integral heat trap glazing 36 which also serves as the light-transmitting front wall of the transpiration solar air heater. The integral heat trap glazing 36 is of basically the same construction as that shown in FIG. 1, including a flat upper surface 36a and a lower surface 36b which is formed by a multiplicity of cellular openings. In this instance, however, the assembly of the integral heat trap glazing 36 in the housing is such as to provide an enlarged space 38. This space 38 provides a passage for the gas such as air to be heated between the lower surface 36b of the heat trap glazing and porous collector plate 32. The integral heat trap glazing may be fabricated using the same conventional molding or forming techniques and the same glass or plastic compositions mentioned above.

The operation of the transpiration solar air heater is similar in that incident solar rays pass through the integral heat trap glazing 36 and are absorbed by the porous collector plate 32 and converted to heat. However, in this instance, the gas or air to be heated enters the inlet 28 and follows the flow path between the inlet 28 and outlet 30. The gas or air passes or transpires through the entire porous collector plate 32 and is heated. The heated gas or air then exits via the space 40 below the collector plate 32 and through the outlet 30. It should be noted that in this embodiment, the integral heat trap glazing 36 serves the dual function of reducing the radiative heat loss from the solar heater and of providing an air buffer layer composed of baffles which prevent the forced convective flow of the gas or air to be heated adjacent to the front wall where heat losses may occur. The geometry of the integral heat trap glazing 36 in this instance is basically the same as that described above; that is, the aspect ratio may be in the same range of between about 2 and 10 for honeycomb cellular structures and 4 and 20 for finned cellular structures.

In the two embodiments of the present invention illustrated schematically in FIGS. 1 and 2, the integral heat trap glazings 20 and 36 are shown with a lower surface composed of cells having relatively thick walls for purposes of illustration only. It will however be understood that in order to effectively function as a heat trap the walls must be made relatively thin, i.e., in the range of between about 0.0002 and 0.05 centimeters. The thickness of the remaining upper planar portion of the glazing may vary depending on the overall size of the glazing and also on the cell wall thickness selected. Obviously in those instances where the cell wall is very thin the upper planar portion of the glazing must carry a higher fraction of the total load (e.g., its own weight, wind and snow loads, etc.) and therefore must be thicker. On the other hand, where the cell walls are relatively thick, the upper planar portion can be made thinner than if the glazing were constructed without the lower cellular surface which constitutes the heat trap. Generally speaking, the thickness of the upper planar surface will vary between about 0.075 and 0.60 centimeters.

Figure 3:
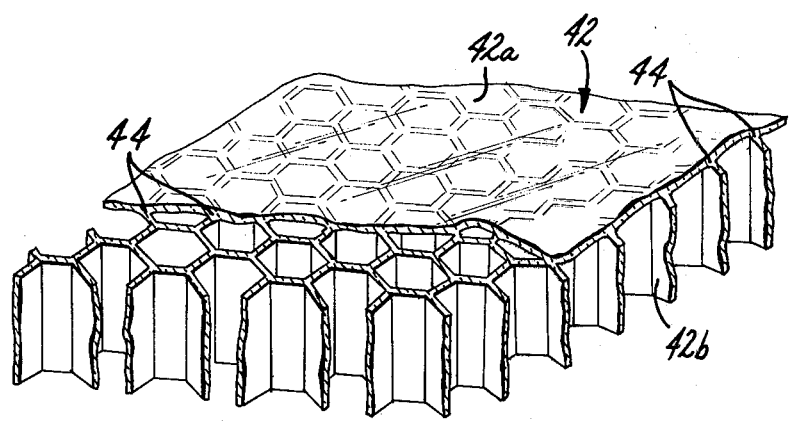
FIG. 3 is a partially cut away perspective view of a preferred embodiment of the integral heat trap glazing of the present invention.

FIG. 3 shows the preferred form of the integral heat trap glazing of the present invention. As shown, the integral heat trap glazing 42 is formed with an upper planar portion 42a having a substantially flat surface and a lower cellular portion 42b comprising cells which have a hexagonal cross section. The walls of the individual cells are integrally formed with the upper planar portion as at 44, providing a continuous distribution of the glazing and heat trap material with no internal surfaces, joints, or adhesive bonds from which incident solar rays might be scattered or reflected.

The integral heat trap glazing can be made by conventional forming or molding techniques well known in the art. For instance, the integral heat trap glazing can most advantageously be made by an expanded core process as disclosed and claimed in U.S. Pat. No. 3,919,446 issued to W. H. Smarook on Nov. 11, 1975, and assigned to the common assignee hereof. Variations and improvements of this process and apparatus for carrying out the process are disclosed and claimed in the following patents: U.S. Pat. Nos. 3,765,810 3,919,379, 3,919,380 and 3,919,445. In the basic process, articles such as the integral heat trap glazing can be made by expanding the cross-section of a blank of thermoformable material in a manner whereby voids such as hexagonal cells are formed from one surface of the blank. The remaining unexpanded portion of the blank forms the upper planar portion of the integral heat trap. Ordinarily, articles formed by this process include a perforated skin on the side opposite to the unexpanded planar portion which must be removed before the article is suitable for use as an integral heat trap glazing. The perforated skin, if not removed, would be oriented such that incident solar rays reflected from it would be directed away from the solar absorber and be lost. The perforated skin may be removed by passing an electrically heated wire through the cell walls immediately adjacent to the skin or by use of a reverse-cutting, knife-edge band saw blade such as that used for the cutting of metallic honeycombs. For a better understanding of the process, reference should be made to the specifications of the aforementioned patents. It will be further understood, of course, that the integral heat trap glazing can be formed by other processes such as injection molding wherein thermoformable material is injected under pressure into a mold having the desired cellular configuration.

It may be noted that the cellular portion of the integral heat trap glazing 42 has been shown in the drawing with cell walls perpendicular to the upper planar portion 42a. The present invention however is not so restricted and the cell walls may be disposed at angles other than perpendicular so long as any solar rays reflected from the cell walls are not directed back toward the upper planar portion during normal periods of operation. Thus the term "substantially perpendicular to the upper planar portion", as used herein and in the appended claims is intended to include such other angles with reference to the orientation of cell walls. It has been determined that the cell walls may be disposed at angles with respect to the perpendicular of up to about 22.5 degrees without incident solar rays being reflected away from the solar absorber when the normal period of operation is taken to be about three hours before and after solar noon. For a more detailed explanation of the cell wall angle and how it is derived, reference is made to our copending application Ser. No. 824,100 which is incorporated herein by reference.

From the foregoing, it will be readily seen that the present invention provides a solar heater in the form of either a flat plate heater or a transpiration air heater having an integral heat trap glazing which is self-supporting and which has a high overall transmission of incident solar rays. In addition, the present invention provides an integral heat trap glazing for use in solar heaters which has a high strength to weight ratio and which is durable, easy to handle, and economical to manufacture.

What is claimed is:

1. In a solar air heater comprising, in combination:
    a housing having a light-transmitting front wall for passing incident solar radiation and including an inlet and an outlet for establishing a flow path for a gaseous medium to be heated,
    a gas-permeable radiation absorbent collector element positioned across the flow path in said housing and arranged to accept incident solar radiation passing through said front wall and to transfer the absorbed heat to said gaseous medium passing along said flow path and through said collector element, and
    a radiation trap disposed in said housing adjacent to the surface of said front wall facing said collector element, said radiation trap comprising a cellular honeycomb structure containing a multiplicity of open cells in communication with said flow path and having cell walls which are substantially perpendicular to said front wall and which serve as baffle elements to inhibit the flow of said gaseous medium through said radiation trap in a direction substantially parallel to the plane of said front wall, said cellular structure being maintained in at least firm mechanical contact with said front wall and being composed of a light-transmitting material which is opaque to infrared radiation emitted from said collector element in a direction toward said front wall; the improvement of integrally forming said light-transmitting front wall and heat trap as a unitary member thereby eliminating interfacial surfaces, joints or adhesive bonds therebetween which can act as scattering sites for incident light.

2. A solar heater according to claim 1 wherein said transparent honeycomb is composed of a multiplicity of cells having a hexagonal cross-section.

3. A solar heater according to claim 1 wherein said transparent honeycomb is composed of a multiplicity of cells having a length to diameter ratio of between about 2 and 10.

4. A solar heater according to claim 1 wherein said transparent honeycomb is composed of a multiplicity of cells having walls of a thickness within the range of from about 0.0002 to about 0.05 centimeters.

5. A solar heater according to claim 1 wherein said light-transmitting material is glass or a clear plastic composition selected from the group consisting of polyvinyl fluoride, polycarbonate, fluorinated ethylene propylene, polymethyl methacrylate, aromatic polysulfones, polyethylene terephthalate, aromatic polyesters, polyvinylidene fluoride, hexafluoropropylene, chlorotrifluoroethylene and tetrafluoroethylene copolymers.

6. A solar heater according to claim 1 wherein said means for passing a fluid medium to be heated comprises an enclosed passageway for circulating said fluid through said housing which is placed in at least close proximity to said radiation absorbent collector element.

7. A solar heater according to claim 1 wherein said radiation absorbent collector element comprises a porous opaque mat made from a material selected from the group consisting of pressed fibers woven screen, stamped screen and reticulated foam.

8. A solar heater according to claim 7 wherein said radiation absorbent collector element is positioned in non-parallel relation to said unitary member.

9. A solar heater according to claim 1 wherein said radiation absorbent collector element is positioned in substantially parallel, spaced apart relation to said unitary member.

10. A solar heater according to claim 1 wherein said housing includes a bottom wall and opposite side walls and wherein said unitary member is mounted opposite to and spaced from said bottom wall.

11. A solar heater according to claim 1 wherein a layer of insulation is provided adjacent to said bottom wall.

12. A solar heater according to claim 1 wherein said housing is made of metal.

13. A solar heater according to claim 1 wherein said housing is made of a rigid insulating material.

* * * * *